United States Patent
DuBose et al.

(10) Patent No.: US 8,207,628 B2
(45) Date of Patent: *Jun. 26, 2012

(54) OUTPUT POWER PORT MANAGEMENT CONTROL

(75) Inventors: Garry DuBose, Scottsdale, AZ (US); Ann Briggs, Scottsdale, AZ (US)

(73) Assignee: Igo, Inc., Scottsdale, AZ (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/837,413

(22) Filed: Jul. 15, 2010

(65) Prior Publication Data

US 2010/0308652 A1    Dec. 9, 2010

Related U.S. Application Data

(63) Continuation of application No. 11/880,008, filed on Jul. 19, 2007, now Pat. No. 7,781,908.

(51) Int. Cl.
*H02H 3/00* (2006.01)

(52) U.S. Cl. ............... 307/31; 307/11; 307/18; 307/19; 307/20; 307/21; 307/22; 307/24; 307/25; 307/26; 307/35; 307/38; 307/39

(58) Field of Classification Search .............. 307/11, 307/30–35, 38–39, 18–22, 24–26, 29
See application file for complete search history.

(56) References Cited

U.S. PATENT DOCUMENTS

| | | | |
|---|---|---|---|
| 3,671,853 A * | 6/1972 | Weischedel et al. ........ 323/267 |
| 3,790,878 A * | 2/1974 | Brokaw ...................... 323/267 |
| 4,357,572 A * | 11/1982 | Andersen et al. ........... 323/286 |
| 4,855,858 A * | 8/1989 | Boertzel et al. ............. 361/18 |
| 4,907,116 A * | 3/1990 | Aschwanden et al. ....... 361/18 |
| 5,119,013 A * | 6/1992 | Sabroff ....................... 323/267 |
| 5,563,455 A * | 10/1996 | Cheng ........................ 307/41 |
| 5,715,153 A * | 2/1998 | Lu ............................. 363/65 |
| 5,835,360 A * | 11/1998 | Jansen ....................... 363/21.04 |
| 6,028,373 A * | 2/2000 | Kim et al. ................... 307/31 |
| 6,067,241 A * | 5/2000 | Lu ............................. 363/65 |
| 6,108,246 A * | 8/2000 | Umezawa et al. .......... 365/189.09 |
| 6,121,693 A * | 9/2000 | Rock ......................... 307/18 |
| 6,225,708 B1 * | 5/2001 | Furukawa et al. ........... 307/66 |
| 6,636,023 B1 * | 10/2003 | Amin ......................... 323/268 |
| 6,937,490 B2 * | 8/2005 | MacDonald et al. ........ 363/142 |
| 7,057,310 B2 * | 6/2006 | Liu et al. .................... 307/126 |
| 7,245,515 B2 * | 7/2007 | Chiang ....................... 363/146 |
| 7,486,056 B2 * | 2/2009 | Shuey ........................ 323/266 |
| 7,489,118 B2 * | 2/2009 | Fujii .......................... 323/268 |
| 7,531,914 B1 * | 5/2009 | Moore ........................ 307/35 |
| 2004/0104707 A1 * | 6/2004 | May et al. ................... 320/136 |
| 2005/0015721 A1 * | 1/2005 | Tsai ........................... 715/513 |
| 2005/0127984 A1 * | 6/2005 | Ohtaka ....................... 327/536 |
| 2007/0279024 A1 * | 12/2007 | Falvey et al. ................ 323/280 |

* cited by examiner

*Primary Examiner* — Adi Amrany
(74) *Attorney, Agent, or Firm* — Snell & Wilmer L.L.P.

(57) ABSTRACT

A power converter that gives priority to the high power output and only provides power to the low power output when the total potential output power is equal to or less than the rated power of the power converter. A specific power threshold is established, and when the high power output remains below this threshold for a period of time the low power output is allowed to turn on. If the high power output subsequently exceeds this threshold for a period of time, then an electronic circuit powers down the low power output in order to keep the total output power below the rated power of the power converter. Subsequently, the high power output is checked against the threshold to determine if the low power output can be turned on again. If the high power output is below the threshold, then the low power output is turned on.

17 Claims, 4 Drawing Sheets

OUTPUT POWER PORT MANAGEMENT CONTROL

CROSS-REFERENCE TO RELATED APPLICATIONS

This application is a continuation of U.S. patent application Ser. No. 11/880,008, now U.S. Pat. No. 7,781,908, filed on Jul. 19, 2007, and entitled "OUTPUT POWER PORT MANAGEMENT CONTROL", and hereby incorporated by reference.

FIELD OF THE INVENTION

The present invention generally relates to the field of power converters, and more particularly to a power converter having both a high power output and low power output for use with portable electronic devices.

BACKGROUND OF THE INVENTION

As the use of mobile electronic devices, such as PC notebooks, PDAs, cellular telephones, MP3 players, cameras and the like continues to increase, the need for low cost, compact power converters to power and recharge these devices also continues to increase. Most manufacturers of mobile devices typically include plug-in power adapters along with these mobile devices to power and charge batteries of these devices.

Today's power converters are typically AC-to-DC, or DC-to-DC power converters, which are configured to either step-up or step-down the DC voltage input delivered to the mobile device. With AC-to-DC converters, for example, users can power most mobile devices by simply plugging the converter into a standard AC wall outlet commonly found in most homes or offices. Similarly, when only DC input power is available, such as in an automobile or airplane, users can still power their mobile devices by using a standard, off-the shelf DC-to-DC converter. Normally, both converters are designed and tailored to provide a regulated DC output voltage, which can typically range from between 5 VDC to 30 VDC depending on the kind of mobile device being powered.

Typically, dual output power converters provide power to both the high power output and the low power output and monitor for an over power condition. An over power condition is when the sum total of the output power exceeds a threshold, such as the converter power rating. A typical converter may be rated at 65 W, providing up to 50 W continuous power or more to the main power output, and up to 15 W continuous power to the low power output. When the sum of the output power exceeds the converter 65 W rating for a period of time, the entire converter resets and power is interrupted from both outputs. This complete shutdown is inconvenient to a user trying to utilize or power both devices.

Accordingly, there is a need to avoid a complete shutdown of a dual output converter when an over power condition occurs.

Although these power converters conveniently provide direct power and recharging capabilities, users are often required to carry separate converters to provide power to each individual mobile device. This often means that users have to carry multiple converters: one for an AC input power source, and another for a DC input power source. This often means that users are typically required to carry multiple power converters to power multiple devices. Thus, by carrying multiple mobile devices, users are often forced to carry more than one power supply converter, thereby increasing the amount of bulk a user is required to carry.

Some power converters provide two output voltages enabling two devices to be powered by a single converter. By providing a power converter that has both high power output and low power output terminals, users have the ability to provide power to several mobile devices of varying power requirements, simultaneously, regardless of whether the input voltage is AC or DC.

SUMMARY OF INVENTION

The present invention achieves technical advantages as a power converter that gives priority to the high power output and only provides power to the low power output when the total potential output power is equal to or less than the rated power of the power converter. A specific power threshold is established, and when the high power output remains below this threshold for a period of time the low power output is allowed to turn on. If the high power output subsequently exceeds this threshold for a period of time, then an electronic circuit powers down the low power output in order to keep the total output power below the rated power of the power converter. After a period of time, the high power output is checked against the threshold to determine if the low power output can be turned on again. If the high power output is below the threshold, then the low power output is turned on. Subsequently, if the high power output level exceeds the converter rating for a period of time, the high power port and the low power port are turned off and the converter must be unplugged from its power source and then plugged back in. Additionally, the low power output will be shutoff if a short circuit is applied to the low power output either before the converter is powered or after the converter is powered and operating normally.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which.

DETAILED DESCRIPTION OF THE PRESENT INVENTION

The present invention may be described herein in terms of various functional components and various processing steps. It should be appreciated that such functional components may be realized by any number of hardware or structural components configured to perform the specified functions. For example, the present invention may employ various integrated components, such as buffers, current mirrors, and logic devices comprised of various electrical devices, e.g., resistors, transistors, capacitors, diodes and the like, whose values may be suitably configured for various intended purposes. In addition, the present invention may be practiced in any integrated circuit application. However for purposes of illustration only, exemplary embodiments of the present invention will be described herein in connection with a switching power converter for use with power supply circuits. Further, it should be noted that while various components may be suitably coupled or connected to other components within exemplary circuits, such connections and couplings can be realized by direct connection between components, or by connection through other components and devices located thereinbetween.

Figure 1:
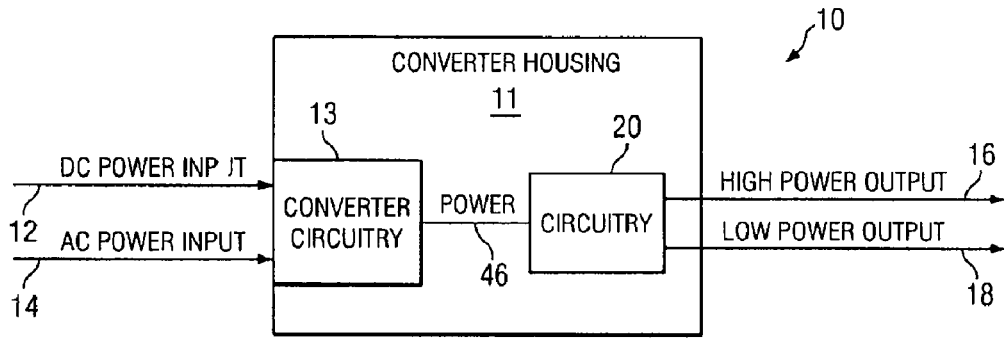
FIG. 1 shows a block diagram of a dual input AC and DC power converter having high power and low power outputs in accordance with the present invention.

There is shown in FIG. 1 a block diagram of dual input AC/DC power converter 10 having dual DC voltage outputs in accordance with the present invention. The converter may be a dual input AC/DC converter as shown, but may also be a single input AC or DC input converter as desired. Dual input AC/DC power converter 10 comprises input converter power circuitry 13 and power converter circuitry 20. Power converter circuitry 20 is seen housed in converter housing 11 and advantageously provides both high power output 16 and low power output 18. Both of these DC output voltages may be generated as a function of either the AC or DC input voltages.

DC power input 12 and AC power input 14 are configured such that different power cords are adapted to receive input power from different sources, which power cords may form part of DC power input 12 and AC power input 14. For instance, DC power from an airplane or car power source can to couple to DC power input 12, and an AC source can couple to AC power input 14. Power converter circuitry 20 is adapted to provide priority to high power output 16 and only power low power output 18 when it is determined that the total high output power is equal to or less than a predetermined power threshold for the power converter.

Figure 2:
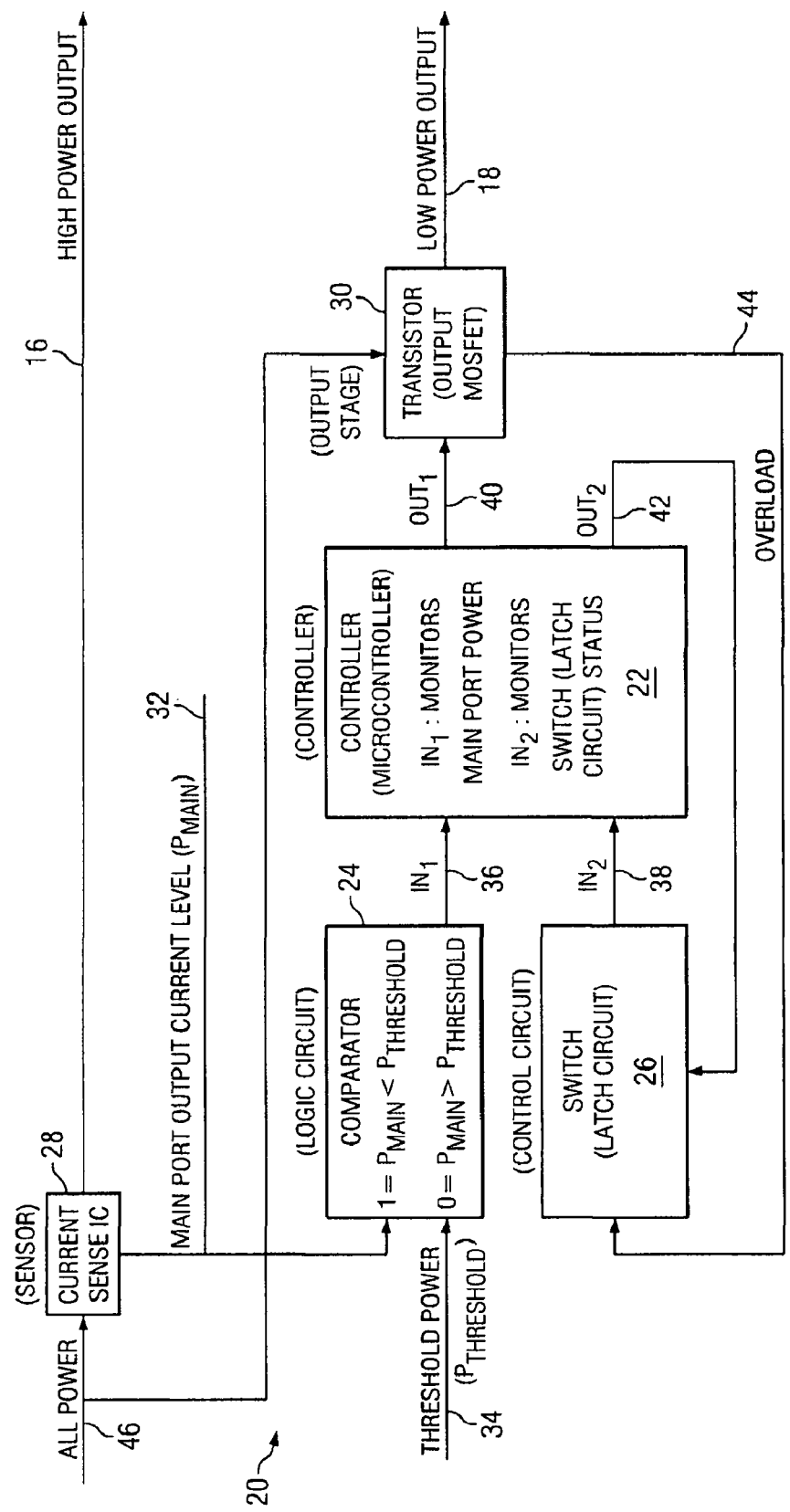
FIG. 2 shows a detailed block diagram of an exemplary embodiment of the low power output port digital control circuit in accordance with the present invention.

Referring now to FIG. 2 there is shown a detailed block diagram of the power converter circuitry 20 of the dual input AC/DC power converter 10 as depicted in FIG. 1 in accordance with an exemplary embodiment of the present invention. As described herein in greater detail, power converter circuitry 20, in an exemplary embodiment, comprises controller 22, logic circuit 24, control circuit 26, sensor 28, and output stage 30.

Dual input AC/DC power converter 10 as depicted in FIG. 1 details DC power input 12 and AC power input 14, either of which provides power denoted as all power 46 that is provided to power converter circuitry 20 in FIG. 2. All power 46 is received by sensor 28, which in one preferred embodiment is a current sense integrated circuit. Sensor 28 senses the delivered high power output 16 current level and generates sensor signal $P_{main}$ 32 indicative of high power output 16.

Sensor signal $P_{main}$ 32 is received by logic circuit 24, which in the preferred embodiment is a comparator, and compares it to power threshold $P_{threshold}$ 34. For example, if the converter total power output rating is 65 W, the power threshold $P_{threshold}$ 34 could be set at 50 W or a different value. Logic circuit 24 comparator compares sensor signal $P_{main}$ 32 to the power threshold $P_{threshold}$ 34, and generates input logic signal $In_1$ 36. If sensor signal $P_{main}$ 32 is determined to be less than power threshold $P_{threshold}$ 34, then input logic signal $In_1$ 36 is the Boolean value 1. If sensor signal $P_{main}$ 32 is determined to be greater than power threshold $P_{threshold}$ 34, then input logic signal $In$ 36 is the Boolean value 0. In the above example, if power threshold $P_{threshold}$ 34 is established to be 50 W and sensor signal $P_{main}$ 32 is only 45 W, the input logic signal $In_1$ 36 would be the value 1, whereas if power threshold $P_{threshold}$ 34 is established to be 50 W and sensor signal $P_{main}$ 32 is 55 W, input logic signal $In_1$ 36 would be the value 0.

Input logic signal $In_1$ 36 is received by controller 22, which in the preferred embodiment is a microcontroller. Controller 22 receives input logic signal $In_1$ 36 and generates output signal $Out_1$ 40 coupled to output stage 30. In one preferred embodiment, output stage 30 is a MOSFET transistor. If controller 22 receives a Boolean value of 1 as input logic signal $In_1$ 36 for a predetermined time period, such as 5 seconds, output signal $Out_1$ 40 enables output stage 30 because the logic circuit 24 determined that enough spare power is available to enable the low power output 18 while high power output 16 is enabled. If controller 22 receives a Boolean value of 0 as input logic signal $In_1$ 36, for a predetermined time period, such as 5 seconds, output signal $Out_1$ 40 disables output stage 30. Advantageously, disabling output stage 30 disables only the low power output 18, thus preventing the situation where the power converter is shut down altogether.

Control circuit latch 26, which in the preferred embodiment is a latch circuit switch and electronic fuse, monitors the current flowing to low power output 18 by sensing overload signal 44 provided by output stage 30. If no overload condition of the low power output exists, control circuit latch 26 remains off and controller 22 continues normal operation by continuing to enable low power output 18. If an overload condition of the low power output exists, control circuit latch 26 immediately switches on and controller 22 disables low power output 18 before the electronic device coupled to the low power output can be permanently damaged and before output stage 30 can be damaged.

If output signal $Out_1$ 40 disables output stage 30, disabling low power output 18 due to an overload condition as indicated by overload input signal $In_2$ 38, output stage 30 provides overload signal 44 to control circuit latch 26 such that control circuit latch 26 is set. Control circuit latch 26 generates overload input signal $In_2$ 38, which is indicative of the latch status. Controller 22 receives overload input signal $In_2$ 38. If overload signal 44 continues to indicate the overload condition, controller 22 generates output signal $Out_2$ 42 to control circuit latch 26, in addition to overload signal 44. Control circuit latch 26 will then continually be set, and controller 22 will continue to disable low power output 18 while still enabling high power output 16. Once control circuit latch 26 remains off for a predetermined period of time, such as 5 seconds, controller 22 determines that overload signal 44 is removed, and output signal $Out_1$ 40 will once again enable output stage 30 to enable low power output 18.

Figure 3:
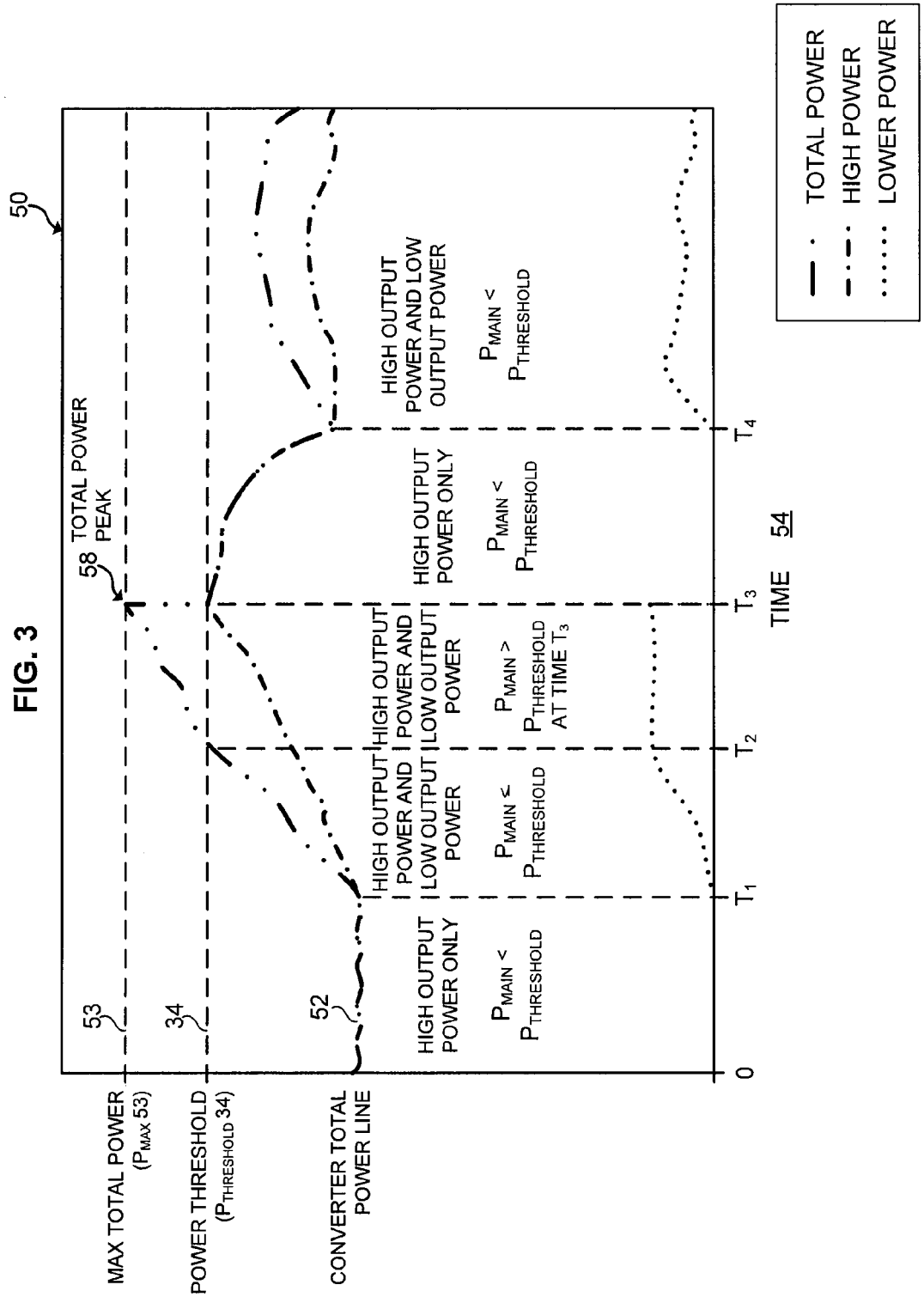
FIG. 3 shows a waveform diagram of total converter power output at various stages in accordance with the present invention.

Referring now to FIG. 3 there is shown a waveform diagram 50 of converter total power output 52 at various stages in accordance with the present invention. The converter total power output 52 is graphed as a function of time 54. The power threshold 34 ($P_{threshold}$ 34) as previously discussed in reference to FIG. 2, is marked by the lower dashed horizontal line and the converter rated maximum total power 53 ($P_{max}$ 53) is marked by the upper dashed horizontal line.

Between time $T_0$ and time $T_1$, converter total power output 52 represents only high power output 16 being enabled and powering an electronic device, such as a laptop computer, and operating below power threshold $P_{threshold}$ 34. Referring to FIG. 2, this corresponds to sensor signal $P_{main}$ 32 being less than power threshold $P_{threshold}$ 34. Once controller 22 recognizes that high power output 16 is operating below power threshold $P_{threshold}$ 34 for a predetermined time period, the low power output port will be enabled by controller 22 at time $T_1$.

Between time $T_1$ and time $T_2$, converter total power output 52 represents high output power 16 and low output power 18 being enabled with high power output 16 powering an electronic device, such as a laptop computer, and low power output 18 powering a portable electronic device, such as a PDA. Between time $T_1$ and time $T_2$, converter total power output 52 may increase at a steady rate (as shown) or immediately, depending on the load's drawing power. Referring to FIG. 2, this corresponds to where sensor signal $P_{main}$ 32 remains less than power threshold $P_{threshold}$ 34, and converter total power output 52 remains below maximum total power 53 ($P_{max}$ 53). As long as this condition exists, both high power output 16 and low power output 18 will remain enabled by controller 22.

Between time $T_2$ and time $T_3$, converter total power output 52 may increase at a steady rate as either or both high power output 16 and low power output 18 are increasing, in this case when low power output 18 is enabled. Referring to FIG. 2, if sensor signal $P_{main}$ 32 exceeds the power threshold $P_{threshold}$ 34, as shown between time $T_2$ and time $T_3$, then controller 22 sends output signal $Out_1$ 40 to output stage 30 shutting down low power output 18 while continuing to provide power to high power output 16.

Between time $T_3$ and time $T_4$, only high power output 16 is enabled. When high power output 16 drops below power threshold $P_{threshold}$ 34 for a predetermined period of time, such as 5 seconds, controller 22 will once again enable low power output 18, as shown at time $T_4$.

After time $T_4$, as long as high power output 16 remains less than power threshold $P_{threshold}$ 34, controller 22 will continue to enable low output power 18.

Figure 4:
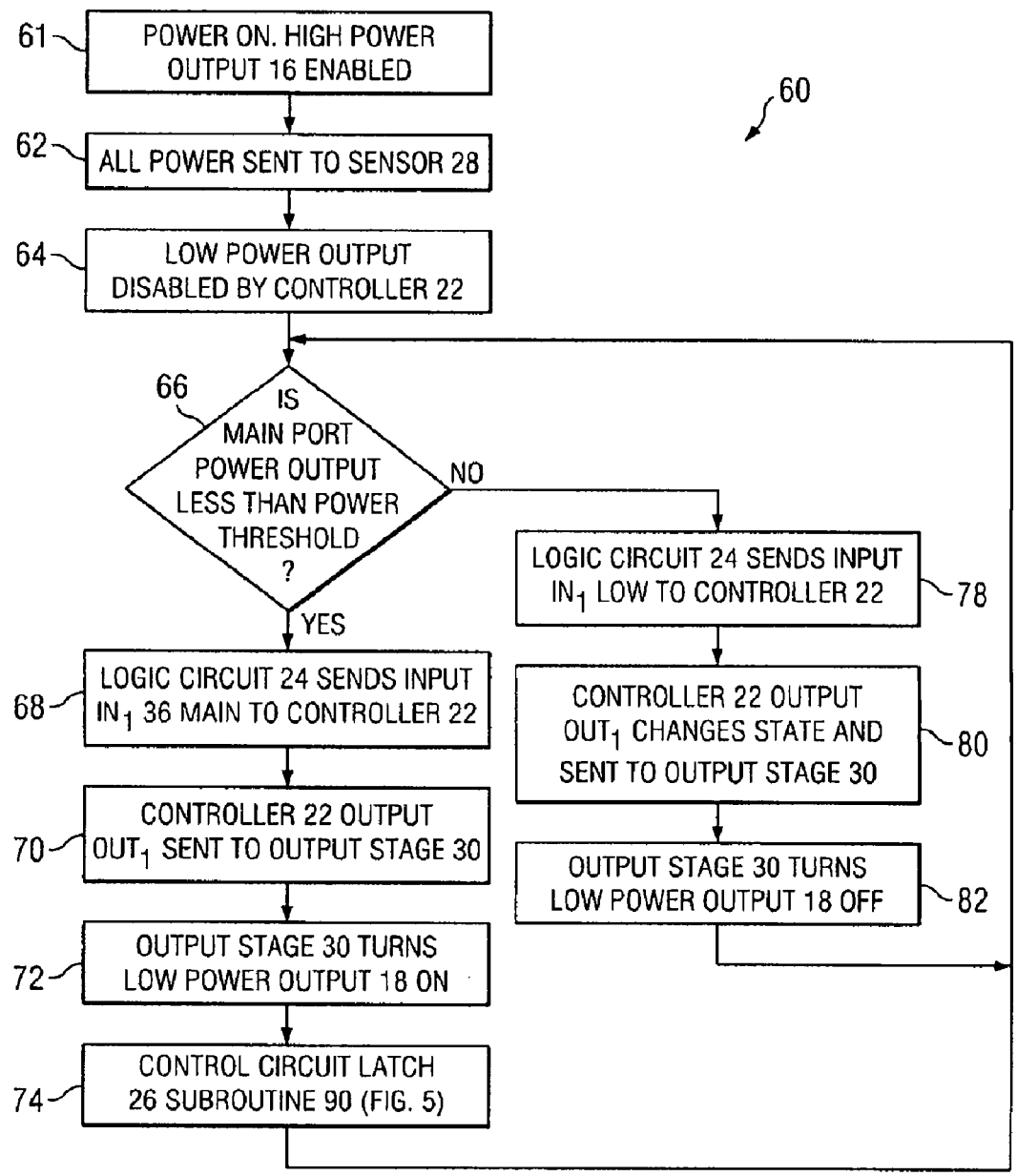
FIG. 4 shows a detailed flow diagram of the methodology of the low power output port digital control circuit in accordance with the present invention.

Referring now to FIG. 4 there is shown a detailed flow diagram 60 of the methodology of one embodiment of the present invention. At step 61, power 46 is turned on. At step 62, power 46 generated by input converter power circuit 13 is sent through sensor 28 of power converter circuitry 20 and low power output 18 is disabled at step 64. Logic circuit 24 receives sensor signal $P_{main}$ 32, which is indicative of main output power 16 and determines if sensor signal $P_{main}$ 32 is less than the predetermined power threshold $P_{threshold}$ 34. For example, if the rated total maximum power output ($P_{max}$ 53) for the power converter is 65 W, power threshold $P_{threshold}$ 34 could be set at 50 W or other appropriate values. If sensor signal $P_{main}$ 32 is not less than power threshold $P_{threshold}$ 34 as indicated by input logic signal $In_1$ 36, for example 55 W, controller 22 will continue checking input logic signal $In_1$ 36 in a closed loop until sensor signal $P_{main}$ 32 is less than power threshold $P_{threshold}$ 34 for a predetermined time period.

At decision 66, when sensor signal $P_{main}$ 32 is determined by logic circuit 24 to be less than power threshold $P_{threshold}$ 34, for example 45 W, logic circuit 24 responsively sends input logic signal $In_1$ 36 main to controller 22, which in an exemplary embodiment is a microcontroller, at step 68. Controller 22 receives input logic signal $In_1$ 36 main and responsively sends output signal $Out_1$ 40, after a predetermined period of time, to output stage 30 at step 70. At step 72, output stage 30, which in an exemplary embodiment is a MOSFET transistor, is enabled by output signal $Out_1$ 40 and delivers power to low power output 18. At step 74, controller 22 initiates latch check subroutine, which will be discussed in FIG. 5.

At decision 66, if sensor signal $P_{main}$ 32 is determined by logic circuit 24 to be greater than power threshold $P_{threshold}$ 34, for example 55 W, logic circuit 24 sends input logic signal $In_1$ low to controller 22 at step 78. Controller 22 output signal $Out_1$ 40 then changes state at step 80 and disables output stage 30 at step 82, thus shutting down low power output 18. The program then returns to decision 66 and continues the process.

Figure 5:
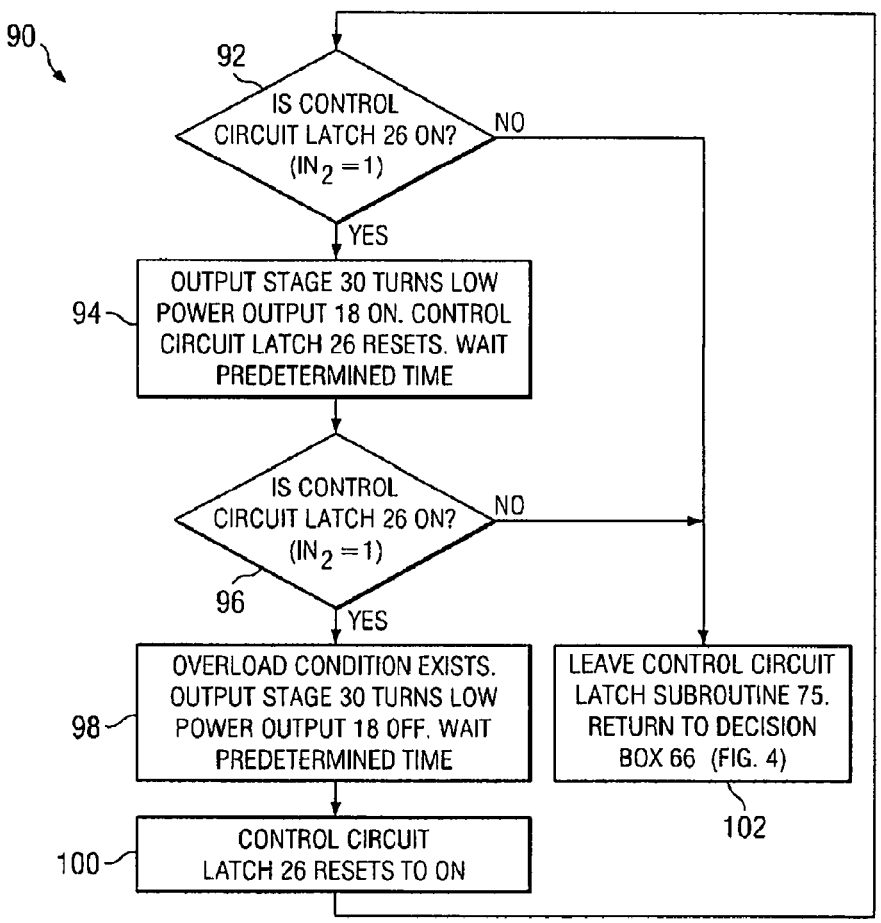
FIG. 5 shows a detailed flow diagram of the methodology of the control circuit latch subroutine in accordance with the present invention.

Referring now to FIG. 5 there is shown a detailed flow diagram 90 of the methodology of the control circuit latch check subroutine 90 of one embodiment of the present invention. At decision 92, if control circuit latch 26 is off when overload input logic $In_2$ 38 equals Boolean value 0 and low power output 18 is not inhibited, at step 102 control latch check subroutine 75 is left and return to decision 66 previously referred to in FIG. 4.

At decision 92, if control circuit latch 26 is on when overload input signal $In_2$ 38 equals Boolean value 1 and low power output 18 is inhibited, output stage 30 turns low power output 18 on and control circuit latch 26 resets in step 94.

At decision 96 and after a predetermined period of time, such as 2 seconds, if control circuit latch 26 is off when overload input signal $In_2$ 38 equals Boolean value 0 and low power output 18 is not inhibited, at step 102 latch check subroutine 75 is left and return to decision 66 previously referred to in FIG. 4.

At decision 96 and after a predetermined period of time, such as 2 seconds, if control circuit latch 26 is on when overload input signal $In_2$ 38 equals Boolean value 1 and low power output 18 is again inhibited, output stage 30 turns low power output 18 off in step 98 and control circuit latch 26 resets in step 100 and returns in a closed loop to decision 92.

The present invention has been described above with reference to various exemplary embodiments. However, those skilled in the art will recognize that changes and modifications may be made to the exemplary embodiments without departing from the scope of the present invention. For example, the various exemplary embodiments can be implemented with other types of power supply circuits in addition to the circuits illustrated above. These alternatives can be suitably selected depending upon the particular application or in consideration of any number of factors associated with the operation of the system. Moreover, these and other changes or modifications are intended to be included within the scope of the present invention, as expressed in the following claims.

What is claimed is:

1. A power converter circuit of a power converter configured to provide a high power output and a low power output, the power converter circuit comprising:
   a current sensor adapted to sense the high power output and generate a sensor signal;
   a logic circuit adapted to receive the sensor signal and change the state of a logic signal in response to the high power output exceeding a power threshold; and
   a control circuit configured to change states in response to receiving an overload signal, wherein the overload signal is generated in response to an overload condition at a low power output stage;
   wherein the low power output is re-engaged after a lapsing of a predetermined time interval and in response to the logic circuit not indicating the high power output exceeding the power threshold and in response to the control circuit not indicating the presence of the overload signal.

2. The power converter circuit of claim 1, further comprising a controller in electronic communication with the control circuit and the logic circuit, wherein the controller is configured to monitor the state of the control circuit, such that the controller is adapted to inhibit the low power output in response to a change of state of the control circuit while the power converter circuit provides the high power output.

3. The power converter circuit of claim 2, wherein the controller comprises a microcontroller.

4. The power converter circuit of claim 2, further comprising an output stage responsive to the controller adapted to provide the low power output.

5. The power converter circuit of claim 4, wherein the output stage comprises a transistor.

6. The power converter circuit of claim 5, wherein the transistor comprises a MOSFET.

7. The power converter circuit of claim 1, wherein the predetermined time interval is five seconds.

8. The power converter circuit of claim 1, wherein the logic circuit comprises a comparator configured to compare the high power output and the power threshold.

9. The power converter circuit of claim 1, wherein the control circuit comprises a latch circuit.

10. A method of adapting a circuit for use with a converter having a high power output and a low power output to a portable electronic device, the method comprising:
   sensing the high power output at a current sensor and changing the state of a logic signal in response to the high power output exceeding a power threshold;
   inhibiting the low power output in response to detecting an overload condition at a low power output stage while maintaining the high power output; and
   re-engaging the low power output after a lapsing of a predetermined period of time and in response to the logic signal not indicating the high power output exceeding the power threshold and in response to not detecting the presence of the overload condition at the low power output stage.

11. The method of claim 10, wherein the power threshold is less than a converter power rating of the converter.

12. The method of claim 10, wherein the low power output is rated at or below the difference between a converter power rating and the power threshold.

13. The method of claim 10, wherein a comparator provides the logic signal.

14. A method of power converter management comprising:
   determining, at a current monitoring circuit, the value of a high power output of a power converter by monitoring load current of the power converter;
   inhibiting, by the current monitoring circuit, a low power output of the power converter in response to the high power output exceeding a power threshold;
   inhibiting the low power output in response to an overload condition at the low power output; and
   re-engaging the low power output after a lapsing of a predetermined period of time in response to not detecting the overload condition at the low power output and in response to not detecting the high power output exceeding the power threshold.

15. The method of claim 14, wherein the predetermined period of time is five seconds.

16. The method of claim 14, wherein the low power output is rated at or below the difference between a converter power rating of the power converter and the power threshold.

17. The method of claim 14, wherein the high power output voltage is substantially constant.

* * * * *